United States Patent [19]

Seiffhart

[11] 4,409,704

[45] Oct. 18, 1983

[54] PROCESS FOR TREATING MEAT

[76] Inventor: John B. Seiffhart, 867 Kramer Dr., Lodi, Calif. 95240

[21] Appl. No.: 213,554

[22] Filed: Dec. 5, 1980

[51] Int. Cl.³ .............................................. A22C 9/00
[52] U.S. Cl. ......................................... 17/45; 17/25; 99/535; 426/519; 426/524
[58] Field of Search .............. 99/535; 17/25; 100/910; 426/513, 519, 524; 17/45

[56] References Cited

U.S. PATENT DOCUMENTS

| | | | |
|---|---|---|---|
| 3,076,713 | 2/1963 | Maas | 99/107 |
| 3,285,752 | 11/1966 | Hansen | 99/107 |
| 3,497,361 | 2/1970 | Wilcox | 99/107 |
| 3,567,464 | 3/1971 | Stallons | 99/107 |
| 3,644,125 | 2/1972 | LoBiondo | 99/107 |
| 3,775,134 | 11/1973 | Michels . | |
| 3,934,860 | 1/1976 | Michels . | |
| 4,214,518 | 1/1980 | Petsche | 99/535 |

FOREIGN PATENT DOCUMENTS 2720732 11/1978 Fed. Rep. of Germany ........ 99/535
556774   7/1977 U.S.S.R. ................................... 17/25

OTHER PUBLICATIONS

*The National Provisioner,* Sep. 13, 1980, p. 26 ff.
*Meat Industry,* Apr. 1977, pp. 36–38.
*Meat Industry,* Nov. 1980, pp. 50–52.
OHI Company Brochure, Rollo–Massager, upper 2 photographs.

*Primary Examiner*—Willie G. Abercrombie
*Attorney, Agent, or Firm*—Bruce & McCoy

[57] ABSTRACT

A process for treating meat to raise myosin protein to the surface of the meat and to increase the absorption of fluid or additives by first crushing and mashing the meat and then simultaneously shaking and tumbling the meat in a preferred manner while keeping the meat refrigerated and under a vacuum.

14 Claims, No Drawings

PROCESS FOR TREATING MEAT

BACKGROUND OF THE INVENTION

1. Field of the Invention

The present invention relates to processes for treating meat and more particularly to a process for treating a quantity of meat pieces to raise myosin protein to the surface of the pieces of meat and to increase the absorption of fluids or additives.

2. Description of the Prior Art

It has been known for several years that if the myosin protein found in meat can be brought to the surface of the meat, the adhesive qualities of the myosin will bind individual meat pieces during cooking into a solid whole piece of meat. This improves the appearance of the meat for presentation to the market. There have been many machines designed to release the myosin, most of which abrade or cut the surface of the meat, and these machines extract the myosin in a relatively short period of time. However, they are very crude and have a destructive effect on the meat and its resulting appearance. They also reduce the meat's capability to absorb injected pickle or retain its juices. These prior art machines are also often dangerous to operate and require considerable hand labor in processing the individual meat pieces through the machines.

Another type of machine for raising myosin to the surface of the meat employs a method which permits large batches of meat pieces to be worked concurrently without individual hand processing, but the process is much slower. This method involves placing large quantities of meat pieces in large rotatable drums, called tumblers, which have internal paddles or baffles which beat, pound, mix, and tear the meat as the drum rotates to cause the myosin to be released. While this latter tumbling process is effective, and can be used for large quantities of meat without hand processing, it is a very slow process and may take from six to eighteen hours with the machinery of the prior art to effect the proper myosin release. It is also known that tumbling the meat in a vacuum increases the rate of myosin release. The problem with this tumbling method is that high volume production requires a large number of expensive machines to do the work because of the slow processing time.

Using a standard size tumbler, as employed by the prior art, applicant's process reduces the time for releasing the myosin to less than one hour which results in a tremendous increase in production volume per machine. An additional and equally important advantage is that the process of the present invention can be used for delicate meats. A further advantage is that greater fluid absorption of additives such as brine, pickle, and NRBB, is also achieved.

The present prior art tumblers and other meat processing machines for raising myosin cannot be used for the delicate meat products since they destroy the appearance and integrity and absorption capability of the meat pieces. They therefore cannot be advantageously used for processing bone-in ham, boneless smoked hams, other water added meats, port loins, bacon bellies, and picnic and poultry pieces due to their destructive effects on the surface of the meats.

The present invention tumbles the meat pieces in such a different manner that it does not tear the meat apart. It maintains the meat pieces intact whereby the process can be used for meat products that previously could not be quickly processed or could not be processed at all by the prior art machinery.

SUMMARY OF THE INVENTION

The present invention is a process for treating meat to raise myosin protein to the surface of the meat and to increase fluid and additive retention by the meat by first mashing, crushing and puncturing the meat (only the less delicate pieces can be so treated) and then simultaneously shaking the meat while tumbling it in a relatively smooth walled container, end for end, about an axis perpendicular to the longitudinal axis of the container so that the meat pieces tumble over themselves and are alternately compressed and relieved while being continuously shook. The process is enhanced by keeping the meat refrigerated and under a vacuum during the tumbling and shaking.

OBJECTS OF THE INVENTION

It is therefore an important object of the present invention to provide a process for raising myosin protein to the surface of the meat with a minimum of cutting or tearing of the meat during the process in order to keep the meat pieces whole and their appearance intact.

It is another object of the present invention to provide a tumbling process for treating meat which substantially reduces the amount of time necessary to extract myosin as compared with tumbling processes presently in use.

It is a further object of the present invention to provide a tumbling process for treating meat which can be used on delicate meat products such as bone-in-hams, boneless smoked hams, bacon bellies, pork loins, picnic and poultry pieces and water added meats.

And it is still another object of the process of the present invention to increase the fluid and additive retention of the meat for higher product quality and yield.

Other objects of the process of the present invention will become apparent when the description of the preferred embodiment described hereinafter is considered in light of the prior art.

DESCRIPTION OF THE PREFERRED EMBODIMENT

The process of the present invention is most beneficially utilized on meats which have been pickled and are to be cured and cooked or smoked or frozen. After the meat pieces have been injected with pickle, the usual process is to allow them to stand approximately twelve (12) hours to permit the pickle to be absorbed into the meat tissue.

Allowing meat to stand after it has been injected with pickle makes it relatively stiff due to advanced rigor mortis. This stiffness makes the meat more difficult to process, and it therefore takes the prior art tumblers longer to raise the myosin because of the stiff rigor mortis condition.

If the meat pieces are processed by the cutting, macerating, or tumbling processes of the prior art before being allowed to stand the full twelve hours, the tearing of the meat causes it to lose a portion of the pickle and meat juices which results in a lower quality and product yield.

The process of the present invention permits pickled meat to be processed much sooner after the pickle has been injected because the process of the invention is much less destructive of the fluid retention capability of the meat whereby it does not lose pickle and meat juices. The process actually treats the meat to enhance its fluid retention capacity while activating the myosin release mechanism in the meat.

The main characteristic of the process of the present invention is a unique tumbling action. Additionally, it may include a prior processing step which greatly enhances fluid retention and the myosin extraction process, but this step can only be utilized on the less delicate meat products where the appearance of the product is unimportant or the effects are not visible in the final product. The prestep includes passing the meat pieces through a mashing and puncturing device which crushes the meat under a roller to make it pliable and to burst and rupture the internal cells of the meat pieces. The mashing action of the roller breaks down the rigor mortis of the meat as well as causing greater absorption and retention of the injected pickle internally of the meat while at the same time producing an increased release of myosin from those internal cells for extraction to the surface.

The masher used for the prestep includes a roller having sharp radial projections formed on it. When the meat is run under the roller, it punctures and crushes and mashes the meat against a spring loaded plate which evenly distributes the pressure of the roller on the meat irrespective of the varying thickness of the pieces of meat. Other methods of mashing, such as by passing the meat between a pair of opposed rollers may also be effective.

In the preferred embodiment of the process of the present invention, the meat is fed through the masher with the smooth external surface of the meat held intact by the pressure plate while the internal exposed surface of the piece of meat, created by the removal of the bone, is crushed by the projections of the roller. These projections are intended to puncture the surface of the meat and crush and mash the internal fiber and cells.

The pieces of meat are preferably subjected to successive steps of less severe mashing rather than one heavy step. This less severe mashing can be accomplished by placing two machines in tandem with a lighter pressure setting on the pressure plate and then simply running the meat through the two machines successively. It is believed this prestep makes the meat pliable by breaking up the rigor mortis, distributes the injected pickle evenly throughout the meat, and releases myosin within the meat so that the main step of the process is more effective and takes less time to accomplish its objective of bringing the myosin to the surface of the meat.

After mashing, the pieces of meat are placed in large tumblers which are described in applicant's co-pending application Ser. No. 213,555 for A MEAT PROCESSOR filed concurrently herewith. The tumblers of this invention are preferably cylindrical in shape and have relatively smooth internal walls and an interior cavity which has a substantially rectangular vertical cross-section, as can be seen from FIG. 1 of that application. They are arranged to rotate about a horizontal axis perpendicular to the longitudinal axis of the cylinder. The tumblers are filled to approximately three-quarters full with a 2500 pound load of meat being an optimum amount. The tumblers rotate at least one (1) revolution per minute and not more than twenty-five (25) revolutions per minute for effecting the desired result. The optimum rotational speed has been found to be between five (5) and sixteen (16) rpm. The action of these tumblers is to cause the meat to tumble over itself and cycle from a top portion of the mass of meat in the drum to a bottom portion of the mass rather than being pulled from the bottom of the mass as would occur in the prior art cement mixer type of tumblers (a drum which typically would have longitudinal internal baffles or paddles and would rotate on its cylindrical axis). The tumbling action of the present invention effects a massaging action which raises the myosin, but has proven to be nondestructive to delicate pieces of meat.

Simultaneously with tumbling, the drum containing the meat is also shook by an apparatus provided for that purpose. In the MEAT PROCESSOR of my copending application, the drum containing the meat is shaken up and down in the plane of the vertical cross-section of the drum by reciprocating a movable end of the frame supporting the drum up and down. The vibration rate which has been found effective varies between 100 and 800 cycles per minute with the optimum being between 200 and 500 cycles per minute. The action of the tumbling and shaking of the present invention is to cause the pieces of meat to be tumbled from the top to the bottom of the pile so that they are alternately compressed and relieved of pressure. At the same time they are continuously shook. They also tumble over and rub against each other while they move from the top of the pile to the bottom by the action of the rotating and shaking drum. The combined effect of this tumbling and shaking action is to massage the meat and increase the absorption and retention of the pickle for higher quality in firmness and color and higher yield weights while at the same time releasing the myosin and extracting it to the surface of the meat. The myosin extraction time is drastically reduced from hours to minutes and free pickle in the drums is absorbed into the meat.

The release of myosin is further enhanced by refrigerating the meat during the tumbling and shaking step and this is preferably accomplished by cooling the drums in which the meat is massaged. The extraction of myosin is additionally enhanced by placing the meat under a vacuum while it is being tumbled and shook in the drum.

The process of the present invention can be still further speeded up if the meat pieces are tumbled in a container having means for additionally working the meat to more quickly raise the myosin. This working of the meat can be accomplished by inserting a removable sleeve into the tumbler. The sleeve has a roughened internal surface for abrading the meat pieces while they are tumbling. This insert can only be used when the appearance of the meat is unimportant to the final product.

The process of the present invention described herein achieves a substantial reduction in the process time for the extraction of myosin from meat. It has been found that the same amount of myosin can be extracted twenty (20) minutes to one hour by utilizing the steps of the present invention as can be extracted in six to eighteen hours using the tumblers of the prior art.

By utilizing the drum insert to work the meat while it is in the tumbler, the processing time can be reduced down to less than half an hour and even to as little as five minutes for some cuts of meat. However, the insert can only be used when the meat pieces are to be bound together in the final product for forming a solid piece of mat.

Additionally it has been found that the process of the present invention increases the absorption and retention of fluid and additives by the meat. While it is not known why or how it occurs, it has been found that pickle and meat juices which have drained out of the meat after the pickle injection, and which contain valuable proteins, are reabsorbed back into the meat during tumbling and shaking if they are added to the tumbler along with the meat before processing. The result is a more nutritious end product, and the process saves for the consumer valuable proteins which would otherwise be lost.

It will be seen from the foregoing description of the present invention that it will accomplish all of the objectives and advantages attributable thereto. While it has been described in considerable detail, it is not to be limited to such details except as may be necessitated by the appended claims.

I claim:

1. A process for treating a quantity of meat pieces to raise myosin to the surface of the meat and increase fluid and additive absorption and retention comprising
tumbling the meat pieces in a partially loaded container having an interior cavity with a substantially rectangular vertical cross-section by rotating the container about an axis perpendicular to said cross-section whereby the meat tumbles over itself and cycles from a top portion of the mass of meat pieces in the container to a bottom portion of the mass while simultaneously shaking the container and the meat up and down with a reciprocating motion in the plane of said cross-section whereby the meat pieces are alternately compressed and relieved while being shook.

2. The process of claim 1 including pre-treating the meat pieces to cause the myosin in the meat to be released and to tenderize and make the meat pliable before shaking and tumbling the pieces.

3. The process of claim 2 wherein at least a portion of both the myosin is released and the meat is tenderized and made pliable by mashing, crushing, and puncturing the meat under pressure.

4. The process of claim 1 wherein the meat is also refrigerated while it is being tumbled and shook.

5. The process of claim 1 wherein the meat is also under a vacuum while it is being tumbled and shook.

6. A process for treating meat comprising mashing, crushing, and puncturing the meat under pressure whereby the myosin proteins are released and the meat is made pliable, and then
tumbling the meat in a relatively smooth walled partially loaded container having a substantially cylindrical interior cavity, said container being rotated end-for-end about a horizontal axis perpendicular to the longitudinal axis of said cavity while simultaneously shaking said container and said meat pieces up and down a predetermined distance with a reciprocating motion generally in a plane normal to the axis of rotation.

7. The process of claim 6 wherein the meat is tumbled at a rate between one (1) and twenty-five (25) revolutions per minute.

8. The process of claim 6 wherein the meat is reciprocated at a rate between twenty-five (25) and five hundred (500) cycles per minute.

9. the process of claim 6 wherein the meat is also refrigerated while it is being tumbled and shook.

10. The process of claim 6 wherein the meat is also under a vacuum while it is being tumbled and shook.

11. A process for treating meat comprising tumbling the meat in a smooth walled partially loaded container having a substantially cylindrical interior cavity, said container being rotated about a horizontal axis perpendicular to the longitudinal axis of said interior cavity at a rate between one (1) and twenty-five (25) revolutions per minute,
shaking the meat and the container up and down in a plane normal to said axis of rotation and at a rate between twenty-five (25) and five hundred (500) cycles per minute while it is being tumbled,
refrigerating the meat while it is being tumbled and shook,
and performing the tumbling, shaking, and refrigerating actions while the meat is under a vacuum.

12. The process of claim 11 wherein the meat before it is tumbled and shook is mashed, crushed, and punctured by causing it to move between a roller having radial projections on its outer surface and a pressure plate which forces the meat against the roller.

13. The process of claim 11 wherein the meat is tumbled in a container having means for additionally working the meat to more quickly raise the myosin to the surface of the meat.

14. The process of claim 12 wherein at least a portion of the container is reciprocated up and down through a predetermined distance between one-fourth (¼) and two (2) inches.

* * * * *